United States Patent
Popov

[19]

[11] Patent Number: 6,106,243
[45] Date of Patent: Aug. 22, 2000

[54] JET PUMP INSTALLATION FOR CREATING A VACUUM DURING DISTILLATION OF A LIQUID

[76] Inventor: Serguei A. Popov, 4615 Post Oak Pl., Suite 140, Houston, Tex. 77027

[21] Appl. No.: 09/180,844
[22] PCT Filed: Mar. 18, 1998
[86] PCT No.: PCT/RU98/00078
    § 371 Date: Nov. 17, 1998
    § 102(e) Date: Nov. 17, 1998
[87] PCT Pub. No.: WO98/41764
    PCT Pub. Date: Sep. 24, 1998
[51] Int. Cl.$^7$ .................................................. F04B 23/00
[52] U.S. Cl. .............................. 417/313; 417/76; 95/176; 95/177
[58] Field of Search .................... 417/313, 76; 95/176, 95/177; 96/194, 181

[56] References Cited

U.S. PATENT DOCUMENTS

| | | | |
|---|---|---|---|
| 2,680,709 | 6/1954 | Skinner | 202/204 |
| 3,796,640 | 3/1974 | Boomer | 417/313 |
| 4,542,196 | 9/1985 | Morris et al. | 526/64 |
| 4,855,524 | 8/1989 | Harandi et al. | 585/517 |
| 5,015,359 | 5/1991 | Harandi et al. | 208/58 |
| 5,214,157 | 5/1993 | Healy et al. | 549/250 |
| 5,327,735 | 7/1994 | Hatton | 62/292 |

FOREIGN PATENT DOCUMENTS

| | | |
|---|---|---|
| 1050498 | 8/1959 | Germany. |
| 2048156 | 11/1995 | Russian Federation. |
| 2094070 | 10/1997 | Russian Federation. |
| 559098 | 7/1977 | U.S.S.R. . |
| 1733714 | 5/1992 | U.S.S.R. . |

*Primary Examiner*—Charles G. Freay
*Assistant Examiner*—Robert Z. Evora
*Attorney, Agent, or Firm*—Mark A. Oathout

[57] ABSTRACT

The invention relates to the field of petrochemical industry. The essence of the invention: is a vacuum-producing device, comprising a liquid-gas jet apparatus, a separator and a pump, is furnished with a mixer. The gas inlet of the liquid-gas jet apparatus is connected to the pipeline for export of a gas-vapor phase from a rectification column, the liquid inlet of the liquid-gas jet apparatus is connected to the discharge side of the pump, the outlet of the liquid-gas jet apparatus is connected to the separator, the gas outlet of the separator is connected to consumers of compressed gas, the outlet of the mixer is connected to the suction side of the pump, the inlet of the mixer is connected both to the pipeline for export of a liquid faction from the rectification column and to the liquid outlet of the separator. The offered jet pump vacuum-producing unit is more effective, more capable and less harmful to the environment in comparison to existing units.

2 Claims, 1 Drawing Sheet

JET PUMP INSTALLATION FOR CREATING A VACUUM DURING DISTILLATION OF A LIQUID

CROSS-REFERENCES TO RELATED APPLICATIONS

This application is a 371 of PCT/RU98/00078 file on Mar. 18, 1998.

BACKGROUND OF THE INVENTION

The invention relates to the field of oil processing and the petrochemical industry, mainly to installations for vacuum distillation of liquids, such as crude oil for example. It can be used particularly for the rectification of oil stock.

A vacuum-producing unit for crude oil rectification is known, wherein a water steam ejector provides a vacuum in a rectification column (see U.S. Pat. No. 2,680,709, cl. 202–204, 1954).

During operation of this unit vapors of a liquid product mix with the motive water steam. As a result, water condensate with emulsified impurities of oil derivatives is generated. Purification of such waste water from detrimental oil emulsions is a complex technical problem causing significant expenses.

RU patent No. 2048156 (M cl. B 01 D 3/10, 1995) discloses a vacuum unit for the distillation of liquids, which has been chosen by the present inventors as the prototype for the invention. The unit comprises a vacuum rectification column and a vacuum-producing device. The rectification column has a pipeline for feed of a stock product and pipelines for export of a gas-vapor phase and a liquid fraction. The vacuum-producing device is composed of a liquid-gas jet apparatus, a separator and a pump.

In operation of this unit evacuation of the gas-vapor phase from the rectification column is effected by the liquid-gas jet apparatus, which uses the liquid fraction exported from the column as a motive medium. Use of such unit substantially reduces the discharge of waste water with ecologically harmful impurities.

However, the prototype unit has a low efficiency due to the contamination of the motive liquid by oil derivatives and due to the absence of makeup supply of the motive liquid during operation of the vacuum-producing device.

SUMMARY OF THE INVENTION

The present invention is aimed at a rise in efficiency and productivity of the jet pump vacuum unit by providing optimum conditions for makeup supply of the motive liquid to the vacuum-producing device.

The recited problem is solved as follows. A vacuum-producing unit for distillation of a liquid product, comprising a vacuum rectification column with pipelines for feed of a stock product and for export of a gas-vapor phase and at least one liquid fraction, and a vacuum-producing device composed of a liquid-gas jet apparatus, a separator and a pump, is furnished with a mixer. The mixer is a part of the vacuum-producing device, so that the gas the inlet of the liquid-gas jet apparatus is connected to the pipeline for export of a gas-vapor phase, the liquid inlet of the liquid-gas jet apparatus is connected to the discharge side of the pump, the outlet of the liquid-gas jet apparatus is connected to the separator, the gas outlet of the separator is connected to consumers of compressed gas, the outlet of the mixer is connected to the suction side of the pump, the inlet of the mixer is connected both to the pipeline for export of a liquid fraction from the rectification column and to the liquid outlet of the separator.

The location of the mixer at the liquid outlet of the separator and porting of the mixer to the pipeline for export of a liquid fraction from the column allow adjustable and controllable mixing of the motive liquid with the liquid fraction from the rectification column. It follows that, the relative position of the mixer in the vacuum-producing device has great importance.

It is expedient to place the mixer near to the liquid outlet of the separator. Delivery of the liquid fraction from the rectification column into the mixer is also preferable in order to provide a makeup of the motive liquid of the vacuum-producing device. This allows not only refreshing of the motive liquid, but also more intensive condensation of easy-condensable components of the gas-vapor phase in the liquid-gas jet apparatus. Besides, feed of the liquid fraction into the vacuum-producing device through the mixer reduces hydraulic losses during mixing of the liquid fraction with the motive liquid, and, as a result, allows more effective utilization of the motive liquid energy for compression of non-condensable components of the gas-vapor phase. Therefore compressed gas is delivered from the separator to consumers under higher pressure, while power consumption of the vacuum-producing device remains the same.

Additionally, availability of a hydro lock installed between the jet apparatus and the separator is expedient for extension of the operating pressure ranges of the jet apparatus and the separator. The hydro lock makes the jet apparatus and the separator hydraulically isolated and ensures an increased operational reliability and stability of the vacuum-producing device. Necessity in the hydro lock is explained by the fact that in a number of cases it is required to keep a decreased pressure in the separator in order to intensify gas separation. However, the decreased pressure in the separator results in unstable operation of the jet apparatus due to the disturbance of a hydrodynamic balance between the two units. This misbalance worsens the condensation of easy-condensable components in the motive liquid and should be avoided.

BRIEF DESCRIPTION OF DRAWINGS

The drawing in FIG. 1 represents a schematic diagram of the described vacuum unit for distillation of a liquid product.

DETAILED DESCRIPTION OF THE INVENTION

Figure 1:
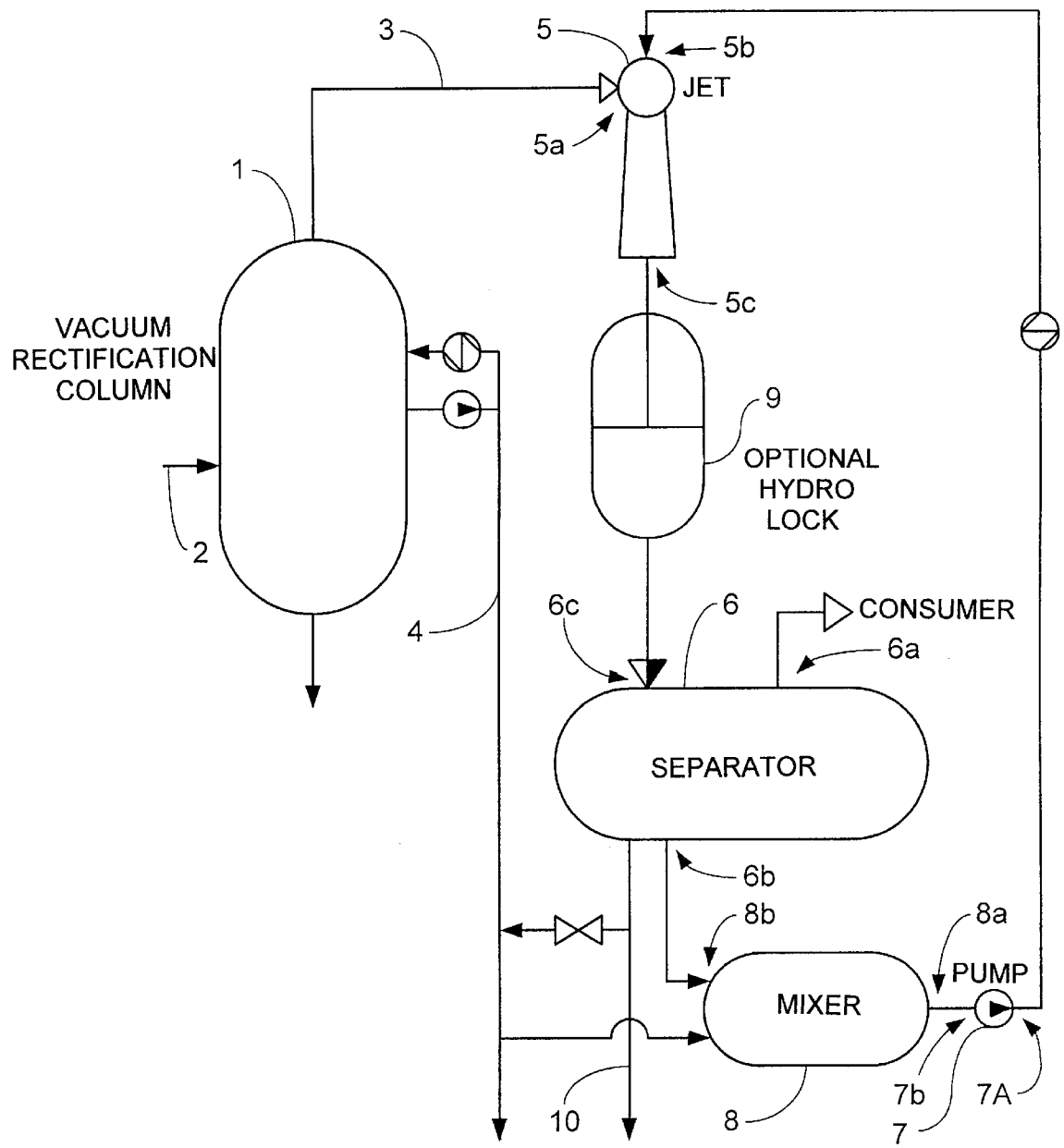

The jet pump vacuum-producing unit for distillation of a liquid product comprises a vacuum rectification column 1 and a vacuum-producing device, composed of a liquid-gas jet apparatus 5, a separator 6 and a pump 7. The column 1 has a pipeline 2 for feed of a stock product, a pipeline 3 for export of a gas-vapor phase and a pipeline 4 for export of a liquid fraction. The vacuum-producing device is furnished with a mixer 8. The gas inlet 5a of the liquid-gas jet apparatus 5 is connected to the pipeline 3 for export of a gas-vapor phase, the liquid inlet 5b of the liquid-gas jet apparatus 5 is connected to the discharge side 7a of the pump 7 and the outlet 5c of the liquid-gas jet apparatus 5 is connected to the separator 6. The gas outlet 6a of the separator 6 is connected to consumers of compressed gas. The outlet 8a of the mixer 8 is connected to the suction side of 7b the pump 7. The inlet 8b of the mixer 8 is connected both to the pipeline 4 for export of a liquid fraction from the rectification column 1 and to the liquid outlet 66 of the separator 6.

The jet pump unit can be furnished with a hydro lock 9, placed between the outlet of the jet apparatus 5 and the separator 6. The separator 6 has a pipeline 10 for discharge of any surplus amount of the motive liquid.

The jet pump vacuum-producing unit operates as follows.

A stock product is fed through the pipeline 2 into the vacuum rectification column 1, where said product is cut into a gas-vapor phase and at least one liquid fraction. The gas-vapor phase is evacuated from the column 1 through the pipeline 3 by the liquid-gas jet apparatus 5. The liquid fraction is exported from the column 1 through the pipeline 4. The motive liquid from the mixer 8 is delivered by the pump 7 into the active nozzle of the liquid-gas jet apparatus 5. Evacuation of the gas-vapor phase through the pipeline 3 occurs during outflow of the motive liquid from the nozzle of the jet apparatus 5. Thus a vacuum in the column 1 is induced. Partial condensation of easycondensable components of the gas-vapor phase and compression of its non-condensable gaseous components occur in the jet apparatus 5 while mixing of the motive liquid with the evacuated gas-vapor phase. The gas-liquid mixture passes from the jet apparatus 5 into the separator 6, where the liquid medium, constituting a mixture of the motive liquid and condensed components of the gas-vapor phase, is separated from the compressed gaseous medium, representing the non-condensable components of the gas-vapor phase compressed in the jet apparatus 5. A part of the motive liquid is discharged from the separator 6 to consumers through the pipeline 10. The other part of the motive liquid flows to the inlet 8b of the mixer 8. Simultaneously, the liquid fraction exported from the rectification column 1 is delivered to the inlet 8b of the mixer 8 through the pipeline 4. An adjustable and controllable process of mixing of the motive liquid from the separator 6 and the liquid fraction delivered through the pipeline 4 is ensured in the mixer 8. This allows feeding of the pump 7 by a homogeneous mixture of the above stated mediums formed with minimum hydraulic losses. The location of the mixer 8 between the separator 6 and the suction port 7b of the pump 7 provides delivery of the degassed motive liquid from the separator 6 into the mixer. This provides feed of the nozzle of the jet apparatus 5 by the motive liquid containing a minimum possible amount of dissolved easy-soluble gases. As far as the liquid fraction from the column 1 is used for makeup of the motive liquid, the surplus amount of the motive liquid (equivalent to the amount of liquid fraction intake) is discharged from the separator 6 through the pipeline 10 for further processing.

In some cases (for example, in case of pressure fluctuations in the separator 6 or in case of relatively low or relatively high pressure in the separator), availability of a hydro lock 9 between the jet apparatus 5 and the separator 6 is expedient. This measure enables one to produce a vacuum in the rectification column 1 without disturbance of operation of the jet pump unit.

The present invention can be used in technological processes or in industries, where vacuum distillation of a stock liquid product is required.

What is claimed is:

1. A jet pump vacuum-producing unit for distillation of a liquid product, comprising:

a vacuum rectification column having a first pipeline for feed of a stock product, a second pipeline for export of a gas-vapor phase and a third pipeline for export of at least one liquid fraction; and a vacuum-producing device comprising a liquid-gas jet apparatus, a separator and a pump, wherein the vacuum-producing device further includes a mixer, wherein a gas inlet of the liquid-gas jet apparatus is connected to the second pipeline, a liquid inlet of the liquid-gas jet apparatus is connected to a discharge side of the pump, an outlet of the liquid-gas jet apparatus is connected to the separator, a gas outlet of the separator is connected to consumers of compressed gas, an outlet of said mixer is connected to a suction side of the pump, and said mixer has at least one inlet connected to the third pipeline and to a liquid outlet of the separator.

2. The jet pump unit according to claim 1, further including a hydro lock, placed between the outlet of the liquid-gas jet apparatus and the inlet of the separator.

* * * * *